(12) United States Patent
Daneshvar et al.

(10) Patent No.: US 6,185,351 B1
(45) Date of Patent: Feb. 6, 2001

(54) ALL-DIELECTRIC, SELF-SUPPORTING, LOOSE-TUBE CABLE WITH OPTICAL FIBER RIBBONS

(75) Inventors: Omid Daneshvar, Marietta; Nathan Scott Hatch; James William Thornton, both of Carrollton, all of GA (US)

(73) Assignee: Lucent Technologies, Inc., Murray Hill, NJ (US)

( * ) Notice: Under 35 U.S.C. 154(b), the term of this patent shall be extended for 0 days.

(21) Appl. No.: 09/419,382

(22) Filed: Oct. 15, 1999

(51) Int. Cl.[7] ................................................ G02B 6/44
(52) U.S. Cl. ................................................ 385/114
(58) Field of Search ........................... 385/100–114, 147

(56) References Cited

U.S. PATENT DOCUMENTS

| | | |
|---|---|---|
| 4,662,712 | 5/1987 | Tabata et al. . |
| 5,109,457 | 4/1992 | Panuska et al. . |
| 5,229,851 | 7/1993 | Rahman . |
| 5,448,669 | 9/1995 | Dunn et al. . |
| 5,621,841 | 4/1997 | Field . |

*Primary Examiner*—Akm E. Ullah

(57) ABSTRACT

An all-dielectric, self-supporting (ADSS), loose-tube fiber optic cable includes a plurality of buffer tubes respectively containing stacks of optical fiber ribbons. The buffer tubes are longitudinally stranded around a longitudinally extending central strength member to define a lay length. A longitudinally extending outer strength assembly extends around the plurality of buffer tubes, and a longitudinally extending sheath extends around the outer strength assembly. A first end of a section of the cable can be attached to a first pole extending upward from the ground and a second end of the section of the cable can be attached to a second pole extending upward from the ground so that the section is suspended between the poles and the section is tensioned due to the weight of the cable. The arrangement of the buffer encasements and the optical fiber ribbons is such that the optical fibers are strained by tensioning of the fiber optic cable that exceeds a predetermined value, and any attenuation of optical signals propagating through the optical fibers is negligible for optical fiber strain up to approximately 0.3 percent. For example, the arrangement of the buffer encasements is preferably characterized by a lay length of at least approximately 400 millimeters. A longitudinally extending inner sheath can extend around the plurality of buffer encasements so that the outer strength assembly is positioned between the inner sheath and the outer sheath.

24 Claims, 3 Drawing Sheets

ALL-DIELECTRIC, SELF-SUPPORTING, LOOSE-TUBE CABLE WITH OPTICAL FIBER RIBBONS

FIELD OF THE INVENTION

The present invention relates to all-dielectric, self-supporting fiber optic cables and, more particularly, to loose-tube fiber optic cables containing optical fiber ribbons.

BACKGROUND OF THE INVENTION

In the manufacture of fiber optic cables, two design types are most frequently employed that are generally referred to as "central-core" and "loose-tube" designs. In the central-core design, a number of optical fibers are contained within a central tube, which is located at the center of the fiber optic cable. Further, strength members are positioned between the central tube and an outer plastic jacket of the cable. In contrast, loose-tube fiber optic cables typically include a number of relatively small buffer tubes that are positioned around a central strength member, and each buffer tube encloses a number of optical fibers. The buffer tubes are longitudinally stranded around the central strength member, meaning that the buffer tubes are rotated around the central strength member along the length of the fiber optic cable. An example of such a loose-tube fiber optic cable is disclosed in U.S. Patent No. 5,621,841.

Fiber optic cables are commonly deployed by installing them in ducts, burying them in the ground, or suspending them between above-ground poles, or the like, along aerial rights of way. Because aerial rights of way have been widely established, fiber optic cables can often be more cost effectively deployed in aerial rights of way than in subterranean rights of way. Further, fiber optic cables that are buried in the ground are often damaged by unintentional excavation of the cables. Thus, it is common for fiber optic cables to be deployed in aerial rights of way.

It is common to deploy a fiber optic cable in an aerial right of way by suspending sections of the cable between spaced-apart poles, or the like. As a result, each section of the cable that is intermediate of a pair of the poles is supported solely by the poles and is constantly tensioned due to the weight of the cable. Such tensile loading is increased by wind impinging upon the cable or accumulations of ice and snow upon the cable. Tensile loading of a fiber optic cable can cause the optical fibers within the cable to become strained in a manner that disadvantageously causes attenuation of optical signals propagating there through.

It is conventional to avoid fiber strain in aerially deployed fiber optic cables by lashing the cables to aerially suspended metal wires or non-metallic rods, or by otherwise attaching the cables to those suspension wires and suspension rods, as described in U.S. Pat. No. 4,662,712. Whereas the metal suspension wires can alleviate strain in fiber optic cables, the metal suspension wires, as well as any metal contained in the fiber optic cables, can attract lightning, which can seriously damage fiber optic cables. Further, an added expenditure is required to obtain metal suspension wires and non-metallic suspension rods that are used in combination with aerially deployed fiber optic cables. In addition, the use of the suspension wires or rods disadvantageously introduces additional steps in the manufacture or installation of fiber optic cables.

As a result of the foregoing, it is common to deploy all-dielectric, self-supporting (ADSS) fiber optic cables (without extra suspension wires or rods) along aerial rights of way so that sections of the cables are supported solely by spaced-apart poles and hardware located solely at the poles, or the like. It is common for such ADSS fiber optic cables to be of the loose-tube type, and for them to be constructed so that the optical fibers therein are not strained at the maximum rated tensile load for the fiber optic cable. The optical fiber strain is typically avoided by not coupling the optical fibers within the buffer tubes to one another, having the interior diameter of the buffer tubes be sufficiently large so that the optical fibers are substantially free to move within the buffer tubes, and in some cases by causing the optical fibers to be longer than the buffer tubes. That is, based on conventional wisdom, ADSS fiber optic cables are commonly constructed so that they contain excess optical fiber length per unit length of their buffer tube, the optical fibers are loosely arranged within their buffer tube (that is, the optical fibers are not in a unitary ribbon-like arrangement), and the buffer tubes are sufficiently large in diameter so that when the cable is loaded to its maximum rated tensile load, the optical fibers therein are free to move and therefore are not strained, even through the cable is strained. It is common for such conventional ADSS fiber optic cables to have lay lengths of from approximately 76 millimeters to 168 millimeters. The lay length is the distance along the central strength member in which the buffer tubes make a complete revolution around the central strength member.

In response to demands for increased optical fiber count in fiber optic cables, optical fiber ribbons have been developed. Optical fiber ribbons are planar arrays of optical fibers that are bonded together as a unit. Optical fiber ribbons are advantageous because many ribbons can be stacked on top of each other within a small space. As stacks of optical fiber ribbons are used in fiber optic cables to increase optical fiber counts, constraints remain on the outer diameters of the cables. As a result, and due to the optical fibers within an optical fiber ribbon being restricted from moving relative to one another, it is common for the optical fibers of loose-tube fiber optic cables containing optical fiber ribbons to be strained when the cable is strained due to tensile loading. The optical fiber strain occurs because the optical fiber ribbons cannot move sufficiently within their buffer tubes to prevent straining of the optical fibers.

As mentioned above, it is conventional for ADSS fiber optic cables to be designed so that there is no strain imparted on the optical fibers therein when the cable is exposed to the maximum rated tensile load. As also mentioned above, it is typical for optical fibers of optical fiber ribbons of a loose-tube fiber optic cable to be strained by tensile loading of the cable. Therefore, there is a teaching away from using optical fiber ribbons in loose-tube ADSS fiber optic cables. Nonetheless, there is a need for ADSS fiber optic cables that contain optical fiber ribbons, due to increasing demands for high fiber counts.

SUMMARY OF THE INVENTION

The present invention solves the above problems, and other problems, by providing an all-dielectric, self-supporting (ADSS), loose-tube fiber optic cable containing optical fiber ribbons. More specifically, in accordance with one embodiment of the present invention, the ADSS fiber optical cable is preferably subjected to constant tensile loading during use and includes a plurality of stacks of optical fiber ribbons that are respectively contained within a plurality of buffer encasements which are preferably in the form of buffer tubes. The buffer encasements are longitudinally stranded around a longitudinally extending central strength member to define a lay length. A longitudinally extending outer strength assembly extends around the plurality of buffer encasements, and a longitudinally extending sheath extends around the outer strength assembly.

As one example, the fiber optic cable can be tensioned by attaching a first end of a section of the cable to a first suspending member, such as a pole extending upward from the ground, and attaching a second end of the section of the cable to a second suspending member, such as another pole extending upward from the ground. As a result of the section of the cable being supported solely by the poles and any hardware closely associated with the poles, the section is constantly tensioned due to the weight of the cable. For example, the fiber optic cable can be attached to the suspending members with standard hardware. It is typical for that hardware to apply "crushing forces" to the fiber optic cable because the hardware is compressed around the cable. In accordance with one aspect of the presentation invention, the fiber optic cable is constructed to protect the optical fibers from the crushing forces. As one example, the fiber optic cable can have two sheaths. As another example, the buffer encasements are constructed of a polymeric material that protects the stacks of optical fiber ribbons from the crushing forces.

In accordance with one aspect of the present invention, the buffer encasements and the optical fiber ribbons are constructed and arranged so that the optical fibers are strained when the fiber optic cable is loaded to its maximum rated tensile load, and any attenuation of optical signals propagating through the optical fibers is negligible for optical fiber strain up to at least approximately 0.275 percent, and most preferably any attenuation of optical signals propagating through the optical fibers is negligible for optical fiber strain up to at least approximately 0.3 percent. This advantage is achieved, at least in part, by controlling the bending stresses that are experienced by the optical fibers. More specifically, the buffer encasements are longitudinally stranded around the central strength member to define a lay length that is preferably at least approximately 400 millimeters. More preferably the lay length is in the range of approximately 400 to 1,000 millimeters, and most preferably the lay length is approximately 600 millimeters. In addition, in an end elevation view of a buffer encasement and the stack of optical fiber ribbons therein, the internal dimensions of the buffer encasement and the external dimensions of the stack are preferably selected so that ample space is available for the stack to move within the buffer encasement.

In accordance with another aspect of the present invention, the fiber optic cable is sufficiently strong so that the cable is not strained by more than approximately 0.390 percent and the optical fibers therein are not strained by more than approximately 0.275 percent when the cable is subjected to tensile loading of up to approximately 1,200 pounds.

In accordance with one embodiment of the present invention, each buffer encasement is longitudinally stranded in the same direction around the central strength member for the entire length of the fiber optic cable. In accordance with another embodiment of the present invention, each buffer encasement is longitudinally stranded in a first direction around a first length of the central strength member to define the lay length, and each buffer encasement is further longitudinally stranded in a second direction around a second length of the central strength member to define the lay length, and this alternating pattern is repeated.

In accordance with one embodiment of the present invention, a representative stack of optical fiber ribbons is longitudinally twisted in a constant direction along its entire length within its respective buffer encasement. In accordance with another embodiment of the present invention, each stack of optical fiber ribbons is longitudinally twisted in a first direction within its respective buffer encasement along a first section of the fiber optic cable, and that same stack of optical fiber ribbons is longitudinally twisted in a second direction within its buffer encasement along a second section of the fiber optic cable, and this alternating pattern is repeated. In accordance with still another embodiment of the present invention, the stacks of optical fiber ribbons are not longitudinally twisted within their buffer encasements.

In accordance with another aspect of the present invention, the optical fiber cable further includes a longitudinally extending inner sheath extending around the plurality of buffer encasements so that the outer strength assembly is positioned between the inner sheath and the outer sheath.

In accordance with another aspect of the present invention, external of the buffer encasements the fiber optic cable is not flooded with a water-blocking substance, which makes opening the cable less messy and keeps the weight of the cable to a minimum. Minimizing the weight advantageously minimizes the tensile loading of the cable.

In accordance with another aspect of the present invention, the optical fibers have low mode field diameters. Most preferably the mode field diameters are less than approximately 9.5 microns.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
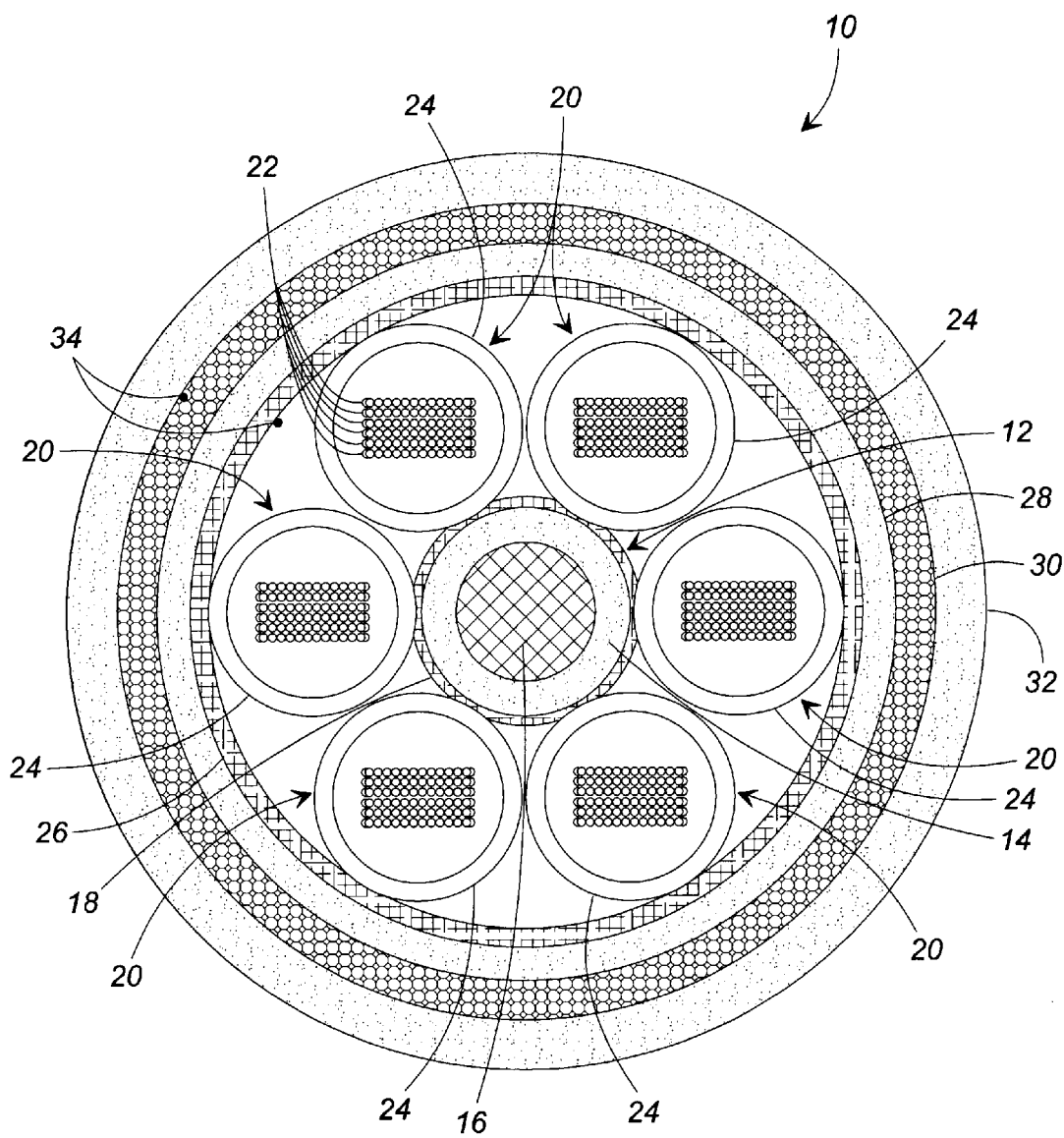
FIG. 1 is a diagrammatic, cross-sectional view of an all-dielectric, self-supporting, loose-tube fiber optic cable, in accordance with a first embodiment of the present invention, wherein the cross-section is perpendicular to the length of the cable.

FIG. 1 illustrates a longitudinally extending all-dielectric, self-supporting (ADSS), loose-tube fiber optic cable 10 in accordance with a first embodiment of the present invention. The fiber optic cable 10 is advantageously designed for being suspended by poles, or the like, so that each section that is intermediate of a pair of spaced-apart poles is supported solely by those spaced-apart poles, and any hardware closely associated with the poles, and is constantly tensioned due to the weight of the fiber optic cable. That tensile loading is increased by wind impinging upon the fiber optic cable 10 and accumulations of ice and snow upon the cable.

The fiber optic cable 10 includes a longitudinally extending central strength member 12. The central strength member 12 has substantial tensile strength and substantial compressive strength. More specifically, in accordance with the first embodiment of the present invention, the central strength member 12 has a modulus of elasticity in the range of approximately 45 gigapascals to 60 gigapascals, and most preferably a modulus of elasticity of approximately 50 gigapascals. The central strength member 12 includes glass strands 16 that are impregnated with a pregnating material 14. The glass strands 16 are continuous fibers that are preferably of the type known to those of ordinary skill in the art as E-glass, or the like. The pregnating material 14 is preferably a conventional thermoplastic or thermosetting resin material, which is covered by a polymeric extrusion 18. As will be apparent from the following, the fiber optic cable 10 preferably includes multiple polymeric extrusions, and each of the polymeric extrusions is acceptably polypropylene, polyvinyl chloride, polyethylene, or the like.

A longitudinally extending optical assembly extends around the central strength member 12, and the optical assembly includes multiple optical fiber assemblies 20. In accordance with the first embodiment of the present invention, each optical fiber assembly 20 includes a stack of optical fiber ribbons 22 that is contained in a buffer encasement, and each buffer encasement is preferably in the form of a buffer tube 24. Only a representative few of the optical fiber ribbons 22 are specifically identified with an element number in FIG. 1. Each of the optical fiber ribbons 22 includes a number of light-transmitting optical fibers aligned in a planar array.

In accordance with the first embodiment of the present invention, the optical fibers of the fiber optic cable 10 are preferably depressed clad optical fibers, however, any type of optical fibers may be used. Depressed clad optical fiber is manufactured by dividing the cladding glass into two regions. The inner region, which is adjacent to and extends around the core, has an index of refraction that is lower than that of pure silica. The outer region, which is adjacent to and extends around the inner cladding, has an index of refraction equivalent to that of pure silica.

In accordance with the first embodiment of the present invention, one acceptable optical fiber ribbon design is described in U.S. Pat. No. 4,900,126, which is incorporated herein by reference. Briefly, each optical fiber ribbon 22 acceptably includes a group of coated glass fibers that are held together with an ultraviolet-curable matrix bonding material, or the like. The group of optical fibers are disposed in a coplanar parallel array, and whereas twelve optical fibers are shown in each optical fiber ribbon 22 illustrated in FIG. 1, it is within the scope of the present invention for optical fiber ribbons to include less than twelve or more than twelve individual fibers. The matrix material fills the interstices between the optical fibers, binds together the optical fibers, and extends to the outside boundary of the ribbon.

Known ultraviolet-curable matrix materials include a resin, a diluent and a photoinitiator. The resin may include a diethylenic-terminated resin synthesized from a reaction of hydroxy-terminated alkyl acrylate with the reaction product of a polyester of polyethyl polyol of molecular weight of 1,000 to 6,000 with an aliphatic or aromatic disocyanate, or diethylenic-terminated resin synthesized from the reaction of glycidyl acrylate with a carboxylic-terminated polymer or polyether of molecular weight 1,000 to 6,000. The diluent may include monofunctional or multifunctional acrylic acid esters having a molecular weight of 100 to 1,000 or N-vinylpyrrolidinone. For the photoinitiator, the composition may include ketonic compounds such as diethoxyacetophenone, acetophenone, benzophenone, benzoin, anthraquinone, and benzil dimethyl ketal. In a typical composition, the bonding matrix may include a resin (50–90%), diluents (5–40%), and a photoinitiator (1–10%). All percentages are by weight unless otherwise noted. Other bonding matrices may include a methacrylate, an UV-curing epoxide or an unsaturated polyester.

Each of the stacks of optical fiber ribbons 22 illustrated in FIG. 1 includes six optical fiber ribbons. However, in accordance with a second example of the first embodiment of the invention, each stack of optical fiber ribbons 22 preferably contains twelve optical fiber ribbons. That is, in accordance with the second example of the first embodiment of the present invention, the fiber optic cable 10 contains eight hundred sixty-four optical fibers.

Each buffer tube 24 is preferably extruded around the stack of optical fiber ribbons 22 it contains. The buffer tube 24 is preferably an extrusion of polymeric material, and the interior of each buffer tube 24 is preferably flooded with a conventional gel, such as a thixotropic gel, as should be understood by those of ordinary skill in the art. The gel protects the stacks of optical fiber ribbons 22, and when the stacks of optical fiber ribbons are twisted during manufacture, as discussed below, the gel holds the stacks in their twisted configurations.

Each buffer tube 24 is preferably formed so each stack of optical fiber ribbons 22 has a negligible excess length in comparison to its respective buffer tube 24 after the fiber optic cable 10 is completely constructed. More specifically, in accordance with the first embodiment of the present invention, for each of the buffer tubes 24, the length of the optical fiber ribbons 22 therein exceeds the length of the buffer tube 24 by approximately 0.1 to 0.2 percent after the fiber optic cable 10 is completely constructed.

As will be discussed in greater detail below, the fiber optic cable 10 can be attached to suspending members with standard hardware or fixtures 36 (FIG. 2) that are compressed around the cable in a manner that applies "crushing forces" to the cable. In accordance with the first embodiment, the buffer tubes 24 are advantageously constructed of a polymeric material that is capable of protecting the stacks of optical fiber ribbons 22 from the crushing forces. The buffer tubes 24 are preferably at least approximately 0.6 millimeters thick and have a modulus of elasticity of approximately 2.4 gigapascals. More specifically, the buffer tubes 24 are preferably constructed of polybutylene terephthalate, which has a modulus of elasticity of approximately 2.4 to 2.6 gigapascals. In accordance with an example of the first embodiment in which each of the buffer tubes 24 contains six optical fiber ribbons 22, each buffer tube has an outer diameter of approximately 5.8 to 6.2 millimeters, and most preferably an outer diameter of approximately 6 millimeters, and an inner diameter of approximately 4.8 to 5.2 millimeters, and most preferably an inner diameter of approximately 5 millimeters. In accordance with an example of the first embodiment in which each of the buffer tubes 24 contains twelve optical fiber ribbons 22, each buffer tube has an outer diameter of approximately 7.0 to 7.2 millimeters, and most preferably an outer diameter of approximately 7.2 millimeters, and an inner diameter of approximately 5.8 to 6.2 millimeters, and most preferably an inner diameter of approximately 6 millimeters.

In an end elevation view of a buffer tube 24 and the stack of optical fiber ribbons 22 therein, the internal dimensions of the buffer tube and the external dimensions of the stack are selected so that ample space is available for the stack to move within the buffer tube. The ample space plays a role in controlling optical fiber strain. This aspect can at least partially be expressed in terms of "packing density" or "clearance." Packaging density is equal to the maximum diagonal cross-dimension of a stack of optical fiber ribbons 22 divided by the interior diameter of its respective buffer tube 24. Clearance is equal to $(id^2-W^2)^{1/2}-nT$, where "id" is the inner diameter of the buffer tube 24, "W" is the width of the optical fiber ribbons 22 within the buffer tube, "n" is the number of the optical fiber ribbons within the buffer tube, and "T" is the individual thickness of the optical fiber ribbons within the buffer tube. In accordance with the first embodiment, for each stack of optical fiber ribbons 22 and its buffer tube 24 a packaging density of not less than approximately 0.68 is defined, more preferably the packaging density is approximately 0.8 to 0.68, and most preferably the packaging density is approximately 0.72. In accordance with the first embodiment, for each stack of optical fiber ribbons 22 and its buffer tube 24 a clearance of at least approximately 1.4 millimeters is defined, more preferably the clearance is approximately 1.4 millimeters to 2.4 millimeters, and most preferably the clearance is approximately 2.06 millimeters.

In accordance with the first embodiment of the present invention, the stacks of optical fiber ribbons 22 are twisted as they are buffered into the buffer tubes 24. Each stack of optical fiber ribbons 22 can be twisted in the same direction for the entire length of its buffer tube 24. In contrast, in accordance with the first embodiment of the present invention, such twisting of each stack of optical fiber ribbons 22 is periodically reversed. More specifically, along a first section of a representative buffer tube 24, the stack of optical fiber ribbons 22 therein is twisted in a first direction to define a lay length, and the stack is twisted in an opposite second direction along a contiguous second section of the buffer tube to again define the lay length. The lay length is the distance along the representative buffer tube 24 in which the stack of optical fiber ribbons 22 therein makes a complete revolution. Regarding the twisting of the stacks of optical fiber ribbons 22 within the buffer tubes 24, in accordance with the first embodiment of the present invention, the lay lengths of the stacks of optical fiber ribbons are at least approximately 400 millimeters, more preferably approximately 400 millimeters to 1000 millimeters, or most preferably approximately 600 millimeters. The first section of the representative buffer tube 24, in which the stack of optical fiber ribbons 22 therein is twisted in the first direction, and the second section of the representative buffer tube, in which the stack of optical fiber ribbons therein is twisted in the second direction, each have a length of approximately 3.6 meters, and the pattern is repeated along the entire length of each of the buffer tubes.

The buffer tubes 24 can be characterized as buffer encasements since they can be shaped differently than illustrated in FIG. 1. That is, in accordance with the first embodiment of the present invention, the buffer encasements are cylindrical, but buffer encasements having other shapes are within the scope of the present invention.

In accordance with the first embodiment of the present invention, the buffer tubes 24 are longitudinally stranded around the central strength member 12, meaning that the buffer tubes are rotated around the central strength member along the length of the fiber optic cable 10 The buffer tubes 24 can acceptably be rotated around the central strength member 12 in the same direction for the entire length of the fiber optic cable 10 However, in accordance with the first embodiment of the present invention, the buffer tubes 24 are stranded around the central strength member in an S-Z arrangement. More specifically, along a first section of the fiber optic cable 10 each of the buffer tubes 24 is longitudinally stranded in a first direction around the central strength member 12 to define a lay length, and along a contiguous second section of the fiber optic cable 10 each of the buffer tubes is longitudinally stranded around the central strength member in an opposite second direction to again define the lay length. The lay length is the distance along the central strength member 12 in which a representative buffer tube 24 makes a complete revolution. In accordance with the first embodiment of the present invention, the lay lengths of the buffer tubes 24 are at least approximately 400 millimeters, or more specifically approximately 400 millimeters to 1,000 millimeters, or most preferably approximately 600 millimeters. The first section of the fiber optic cable 10, along which the buffer tubes are stranded in the first direction, and the second section of the fiber optic cable, along which the buffer tubes are stranded in the second direction, each have a length of approximately 1.5 meters, and the pattern is repeated along the entire length of the cable.

The fiber optic cable 10 further includes conventional water-blocking tape 26 that extends around the buffer tubes 24 for the entire length of the fiber optic cable 10 The water-blocking tape preferably includes, or has associated therewith, a material that absorbs water. Whereas the water-blocking tape 26 can be wrapped around the buffer tubes 24 helically, it is preferred for the tape to extend longitudinally along the length of the fiber optic cable 10 and for the opposite and longitudinally extending edges of the tape to overlap to enclose the buffer tubes.

In accordance with the first embodiment of the present invention, the passage defined by the interior surface of the water-blocking tape 26 is not flooded with a water-blocking substance. That is, the space adjacent to the exterior surfaces of the buffer tubes 24 is preferably not flooded with a water-blocking substance, which advantageously makes opening the fiber optic cable 10 less messy than opening fully flooded cables, and advantageously contributes to minimizing the weight of the fiber optic cable 10. Minimizing the weight advantageously minimizes the tensile loading of the fiber optic cable 10

The fiber optic cable 10 further includes a longitudinally extending inner sheath 28 that extends around the water-blocking tape 26 The inner sheath 28 is acceptably formed by extruding a polymeric material around the water-blocking tape 26

The fiber optic cable 10 further includes a longitudinally extending outer strength assembly 30 that extends around the inner sheath 28 The outer strength assembly 30 includes multiple strands of material having high tensile strength. More specifically, a first group of the strands are wrapped in a first direction around the inner sheath 28 and a second group of the strands are wrapped in an opposite direction around the inner sheath, and each of the groups define approximately the same lay length. In accordance with the first embodiment of the present invention, the strands of the outer strength assembly 30 have a modulus of elasticity in the range of 101.7 gigapascals to 129.7 gigapascals, and most preferably a modulus of elasticity of 115.7 gigapascals. The strands of the outer strength assembly 30 are preferably strands of synthetic fiber, such as aramid fibers, or the like.

The fiber optic cable 10 further includes a longitudinally extending outer sheath 32 that extends around the outer strength assembly 30. The outer sheath 32 is preferably formed by extruding a polymeric material around the outer strength assembly 30. The outer sheath 32, outer strength assembly 30, and inner sheath 28, in addition to the buffer tubes 24, contribute to the protecting of the optical fiber ribbons 22 from the crushing forces associated with the fixtures 36 (FIG. 2) that are compressed around the fiber optic cable 10

In addition, a pair of longitudinally extending rip cords 34 are preferably incorporated into the fiber optic cable 10 The rip cords 34 can be manually used to provide access to internal components of the fiber optic cable 10 in a manner that should be understood by those of ordinary skill in the art. The rip cords 34 can be constructed of a synthetic yarn such as that identified by the KEVLAR trademark.

Figure 2:
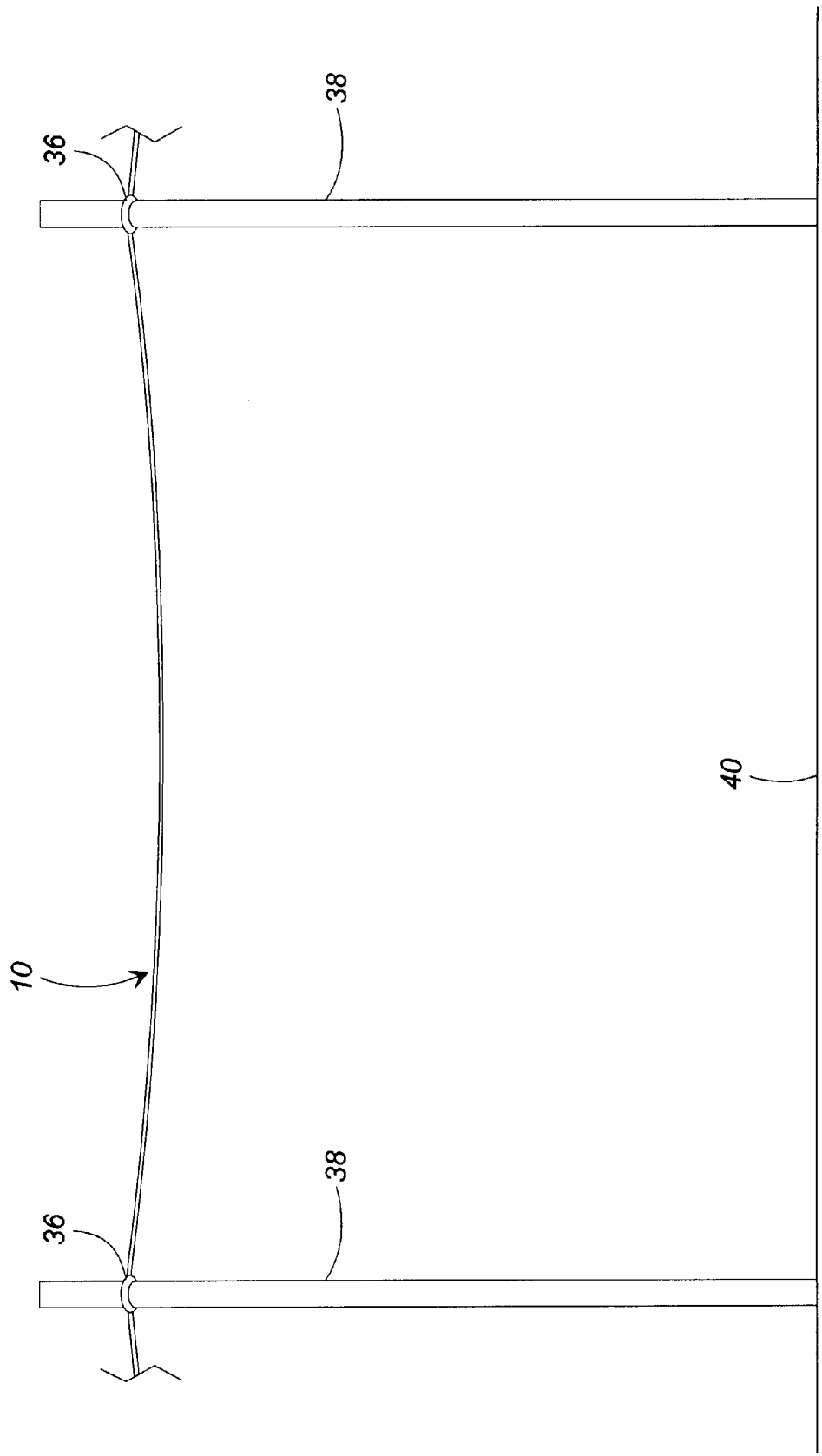
FIG. 2 is a diagrammatic view of a section of the fiber optic cable of FIG. 1 suspended above the ground by poles.

The fiber optic cable 10 is constructed so that it will optimally perform while sections thereof are suspended between suspending members. For example, FIG. 2 diagrammatically illustrates opposite ends of a section of the fiber optic cable 10 being carried by conventional fixtures 36 that are connected to suspending members. Whereas the suspending members illustrated in FIG. 2 are in the form of poles 38 that extend upward from the ground 40, the suspending members can be in any type of conventional device that functions to suspend items along aerial rights of way. That is, the suspending members can include, but are not limited to, poles, towers, buildings, or the like. The length of the section of the fiber optic cable 10 that extends between the connecting fixtures 36 may be approximately up to 600 feet. The cable is constructed so that in a 600 foot section suspended as described for FIG. 2 the optical fibers are not strained by more than approximately 0.3 percent when the suspended section is subjected to heavy loading as defined by the 1997 Edition of the National Electric Safety Code, which is published by The Institute of Electrical and Electronics Engineers, Inc., of New York, N. Y.

The section of the fiber optic cable 10 that is illustrated in FIG. 2 is supported solely by the spaced-apart poles 38 and associated fixtures 36. Therefore, that illustrated section of the fiber optic cable 10 is constantly subjected to tensile loading due to the weight of the cable. When the fiber optic cable 10 is deployed in the ambient environment as illustrated in FIG. 2, the tensile loading of the cable is increased by wind impinging upon the cable and accumulations of ice and snow upon the cable. Thus, the fiber optic cable 10 can be characterized as a self-supporting fiber optic cable since it must support its own weight between the connecting fixtures 36. In addition, the exterior surface of the outer sheath 32 (FIG. 1) of the fiber optic cable 10 is generally cylindrical and all of the strength of the cable is provided within the envelope of the exterior surface of the outer sheath, which distinguishes the cable 10 from cables that are in combination with suspension wires or rods, such as described in U.S. Pat. No. 4,662,712.

Referring back to FIG. 1, a majority of the components of the fiber optic cable 10 contribute, to at least a limited degree, to the tensile strength of the cable. Nonetheless, the major contributors to the tensile strength of the fiber optic cable 10 are the central strength member 12 and the outer strength assembly 30. In addition to being strong, the fiber optic cable 10 is constructed so as to allow, yet limit, strain of the optical fibers of the optical fiber ribbons 22 when the cable is loaded to its maximum rated tensile load. Advantageously, when the optical fibers of the fiber optic cable 10 are strained by the tensile loading of the cable, attenuation of signals propagating through the optical fibers is negligible over a substantial range of optical fiber strain.

Table 1 illustrates the strain experienced by the fiber optic cable 10, the maximum strain experienced by the optical fibers of the cable, and the maximum attenuation of optical signals propagating through the optical fibers of the cable as a function of tensile loading of the cable, in accordance with the first embodiment of the present invention. The data of Table 1 is graphically illustrated in FIG. 3.

TABLE 1

| Tensile Load (lbs.) | Fiber Optic Cable Strain | Maximum Optical Fiber Strain | Maximum Optical Signal Attenuation (dB) |
| --- | --- | --- | --- |
| 0 | 0.000% | 0.000% | 0 |
| 150 | 0.040% | 0.005% | 0 |
| 300 | 0.090% | 0.031% | 0 |
| 450 | 0.150% | 0.057% | 0 |
| 600 | 0.180% | 0.093% | 0 |
| 750 | 0.220% | 0.129% | 0 |
| 900 | 0.260% | 0.171% | 0 |
| 1,050 | 0.300% | 0.212% | 0 |
| 1,200 | 0.340% | 0.248% | 0 |
| 1,350 | 0.390% | 0.279% | 0 |
| 1,500 | 0.420% | 0.320% | 0.01 |
| 1,650 | 0.460% | 0.362% | 0.02 |
| 1,800 | 0.500% | 0.398% | 0.03 |
| 1,950 | 0.540% | 0.444% | 0.04 |
| 2,100 | 0.560% | 0.465% | 0.05 |

Figure 3:
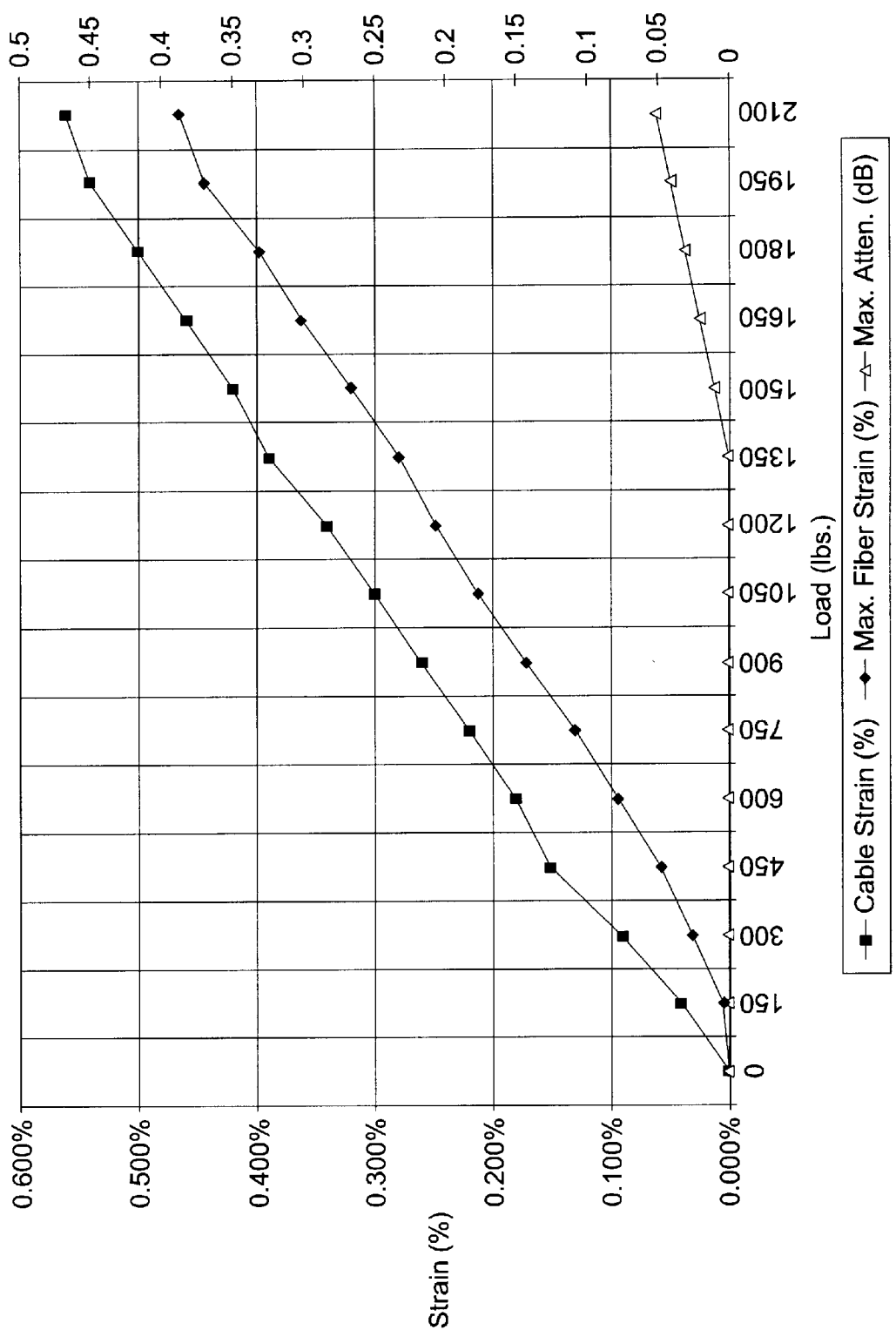
FIG. 3 is a chart that illustrates the strain of the fiber optic cable of FIG. 1, the strain of optical fibers within the cable and attenuation of optical signals propagating through the optical fibers as a function of tensile loading of the cable.

As illustrated by Table 1 and FIG. 3, as the optical fibers of the fiber optic cable 10 are strained by the tensile loading of the cable, the attenuation of signals propagating through the optical fibers is negligible for optical fiber strain up to approximately 0.275 percent, and most preferably the attenuation is negligible for optical fiber strain up to approximately 0.3 percent. Further, the fiber optic cable 10 is sufficiently strong so that the cable is not strained by more than approximately 0.390 percent and the optical fibers therein are not strained by more than approximately 0.275 percent when the cable is subjected to tensile loading of up to approximately 1,200 pounds. Whereas the attenuation is related to the strain of the optical fibers, the attenuation is not caused solely by fiber strain. The attenuation is also caused by the bending of the optical fibers and the forcible engagements of fibers, such as engagement between the optical fibers and the interior surfaces of the buffer tubes 24 (FIG. 1).

In accordance with a second embodiment of the present invention, an all-dielectric, self-supporting fiber optic cable is provided that is identical to the fiber optic cable 10 of the first embodiment, except for variations noted and variations that will be apparent to those of ordinary skill in the art. In accordance with the second embodiment of the present invention, the optical fibers used within the fiber optic cable have a low mode field diameter. Mode field diameter is an attribute of optical fibers that is understood by those of ordinary skill in the art. More specifically, the mode field diameter is preferably less than approximately 9 microns, more preferably the mode field diameter is between approximately 8 microns and 9.5 microns, and most preferably the mode field diameter is approximately 8.8 microns. In addition, in accordance with the second embodiment of the present invention, the optical fiber ribbons are preferably not twisted within their respective buffer tubes.

Referring back to FIG. 1, in accordance with alternatives to each of the first and second embodiments of the present invention, the buffer tubes 24 are not surrounded by water-blocking tape 26, and the passage defined by the interior surface of the inner sheath 28 is flooded with a conventional flooding material that blocks water. Acceptable water-blocking flooding materials include a semisolid polyolefin compound.

In accordance with another alternative embodiment to the present invention, the inner sheath 28 may be eliminated, and the fibers of the outer strength assembly 30 may be coated with a conventional water-absorbing material, as should be understood by those of ordinary skill in the art.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An all-dielectric, self-supporting fiber optic cable that is adapted to be subjected to constant tensile loading during use, the fiber optic cable comprising:
   a longitudinally extending central strength member;
   a plurality of stacks of optical fiber ribbons, wherein each optical fiber ribbon comprises an array of optical fibers that are bound together as a unit;
   a plurality of buffer encasements respectively containing the stacks of optical fiber ribbons, wherein each buffer encasement is longitudinally stranded around the central strength member to define a lay length of at least approximately 400 millimeters, and for each of the stacks of optical fiber ribbons and its respective buffer encasement the maximum diagonal cross-dimension of the stack of optical fiber ribbons divided by the interior diameter of the buffer encasement is not less than approximately 0.68;
   a longitudinally extending outer strength assembly extending around the plurality of buffer encasements; and
   a longitudinally extending sheath extending around the outer strength assembly.

2. A fiber optic cable according to claim 1, further comprising a longitudinally extending inner sheath extending around the plurality of buffer encasements so that the outer strength assembly is positioned between the inner sheath and the outer sheath.

3. A fiber optic cable according to claim 1, wherein each of the buffer encasements is at least approximately 0.6 millimeters thick and has a modulus of elasticity of at least approximately 2.4 gigapascals.

4. A fiber optic cable according to claim 1, wherein any attenuation of optical signals propagating through the optical fibers is negligible for optical fiber strain up to at least approximately 0.3 percent that is caused by the tensile loading of the fiber optic cable.

5. A fiber optic cable according to claim 1, wherein any attenuation of optical signals propagating through the optical fibers is negligible for optical fiber strain up to at least approximately 0.275 percent that is caused by the tensile loading of the fiber optic cable.

6. A fiber optic cable according to claim 1, wherein the lay length is in the range of approximately 400 to 1,000 millimeters.

7. A fiber optic cable according to claim 1, wherein the lay length is approximately 600 millimeters.

8. A fiber optic cable according to claim 1, wherein for each of the stacks of optical fiber ribbons and its respective buffer encasement the maximum diagonal cross-dimension of the stack of optical fiber ribbons divided by the interior diameter of the buffer encasement is approximately 0.8 to 0.68.

9. A fiber optic cable according to claim 1, wherein the fiber optic cable is sufficiently strong so that the optical fibers are not strained by more than approximately 0.275 percent when the cable is subjected to tensile loading of up to approximately 1,200 pounds.

10. A fiber optic cable according to claim 9, wherein the fiber optic cable is sufficiently strong so that the fiber optic cable is not strained by more than approximately 0.390 percent when the cable is subjected to tensile loading of up to approximately 1,200 pounds.

11. A fiber optic cable according to claim 1, wherein each buffer encasement is longitudinally stranded in a first direction around a first section of the central strength member to define the lay length and each buffer encasement is further longitudinally stranded in a second direction around a second section of the strength member to define the lay length, and the second direction is opposite from the first direction.

12. A fiber optic cable according to claim 1, wherein the space adjacent to the exterior surfaces of the buffer encasements is substantially void of a flooding material, whereby the substantial absence of a flooding material in the space adjacent to the exterior surfaces of the buffer encasements contributes to minimizing the weight of the fiber optic cable and thereby contributes to minimizing the tensile loading of the fiber optic cable.

13. A fiber optic cable according to claim 1, wherein each ribbon assembly is longitudinally twisted in a first direction within its buffer encasement along a first section of the fiber optic cable and is longitudinally twisted in a second direction within its buffer encasement along a second section of the fiber optic cable, and the second direction is opposite from the first direction.

14. A fiber optic cable according to claim 1, wherein the outer strength member comprises a plurality of first strands and a plurality of second strands, the first strands are wrapped in a first direction around the plurality of buffer encasements, the second strands are wrapped in a second direction around the plurality of buffer encasements, and the second direction is opposite from the first direction.

15. A fiber optic cable according to claim 1, wherein the optical fibers have low mode field diameters.

16. A fiber optic cable according to claim 15, wherein the optical fibers have mode field diameters of less than approximately 9 microns.

17. A fiber optic cable according to claim 15, wherein the optical fiber ribbons are not substantially longitudinally twisted within their respective buffer encasements.

18. An all-dielectric, self-supporting fiber optic cable that is adapted to be subjected to constant tensile loading during use, the fiber optic cable comprising:
   a longitudinally extending central strength member;
   a plurality of stacks of optical fiber ribbons, wherein each optical fiber ribbon comprises an array of optical fibers that are bound together as a unit;
   a plurality of buffer encasements respectively containing the stacks of optical fiber ribbons, wherein each buffer encasement is longitudinally stranded around the central strength member to define a lay length of at least approximately 400 millimeters;
   a longitudinally extending outer strength assembly extending around the plurality of buffer encasements;
   a longitudinally extending sheath extending around the outer strength assembly; and a longitudinally extending inner sheath extending around the plurality of buffer encasements so that the outer strength assembly is positioned between the inner sheath and the outer sheath.

19. A fiber optic cable according to claim 18, wherein each of the buffer encasements is at least approximately 0.6 millimeters thick and has a modulus of elasticity of approximately 2.4 gigapascals.

20. A fiber optic cable according to claim 19, wherein for each of the stacks of optical fiber ribbons and its respective buffer encasement the maximum diagonal cross-dimension of the stack of optical fiber ribbons divided by the interior diameter of the buffer encasement is not less than approximately 0.68.

21. A method of deploying a fiber optic cable, comprising the steps of:

providing a fiber optic cable, the fiber optic cable comprising:
a longitudinally extending central strength member,
a plurality of stacks of optical fiber ribbons, wherein each optical fiber ribbon comprises an array of optical fibers that are bound together as a unit,
a plurality of buffer encasements respectively containing the stacks of optical fiber ribbons, wherein each buffer encasement is longitudinally stranded around the central strength member,
a longitudinally extending outer strength assembly extending around the plurality of buffer encasements, and
a longitudinally extending sheath extending around the outer strength assembly; and suspending a section of the fiber optic cable between suspending members so that the fiber optic cable is constantly subjected to tensile loading due at least to the weight of the cable, the suspending step comprising the steps of attaching a first end of the section of the fiber optic cable to a first suspending member and attaching a second end of the section of the fiber optic cable to a second suspending member.

22. A method of deploying a fiber optic cable according to claim 21, wherein the suspended section of the fiber optic cable is not supported between the first and second ends and a distance of at least 600 feet is defined between the first and second ends so that the suspended section of the fiber optic cable is not supported for a length of at least 600 feet between the first and second suspending members.

23. A method of deploying a fiber optic cable according to claim 21, further comprising the step of causing optical signals to propagate through the optical fibers of the fiber optic cable, wherein at least partially as a result of the suspending step the fiber optic cable is tensioned such that the optical fibers are strained due to the tensioning of the fiber optic cable, and any attenuation of the optical signals propagating through the optical fibers is negligible for optical fiber strain up to at least approximately 0.275 percent.

24. A method of deploying a fiber optic cable according to claim 21, further comprising the step of causing optical signals to propagate through the optical fibers of the fiber optic cable, wherein at least partially as a result of the suspending step the fiber optic cable is tensioned such that the optical fibers are strained due to the tensioning of the fiber optic cable, and any attenuation of the optical signals propagating through the optical fibers is negligible for optical fiber strain up to at least approximately 0.3 percent.

* * * * *

UNITED STATES PATENT AND TRADEMARK OFFICE
CERTIFICATE OF CORRECTION

PATENT NO. : 6,185,351 B1  
DATED : February 6, 2001  
INVENTOR(S) : Daneshvar et al.

Page 1 of 1

It is certified that error appears in the above-identified patent and that said Letters Patent is hereby corrected as shown below:

<u>Title page, Item [56] References Cited,</u>  
U.S. PATENT DOCUMENTS, insert the following:

-- 5,561,730    10/1996    Lochkovic et al.  
   5,830,517    11/1998    Clarke et al. --.

Signed and Sealed this

Eleventh Day of September, 2001

Attest:

*Nicholas P. Godici*

NICHOLAS P. GODICI  
*Acting Director of the United States Patent and Trademark Office*

*Attesting Officer*